United States Patent
Hsieh

(10) Patent No.: US 9,707,522 B2
(45) Date of Patent: Jul. 18, 2017

(54) SEMI-PERMEABLE MEMBRANE AND A METHOD OF MANUFACTURING THE SEMI-PERMEABLE MEMBRANE THEREOF

(71) Applicant: NATIONAL SUN YAT-SEN UNIVERSITY, Kaohsiung (TW)

(72) Inventor: Shu-Chen Hsieh, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 426 days.

(21) Appl. No.: 14/269,868

(22) Filed: May 5, 2014

(65) Prior Publication Data
US 2014/0374261 A1    Dec. 25, 2014

(30) Foreign Application Priority Data

Jun. 20, 2013 (TW) ............... 102121967 A

(51) Int. Cl.
*A61K 35/57*    (2015.01)
*B01D 67/00*    (2006.01)
*B01D 71/02*    (2006.01)

(52) U.S. Cl.
CPC ..... *B01D 67/0079* (2013.01); *B01D 67/0058* (2013.01); *B01D 71/02* (2013.01)

(58) Field of Classification Search
CPC ..................................... A61K 35/57
USPC ....................................... 424/581
See application file for complete search history.

(56) References Cited

U.S. PATENT DOCUMENTS

| | | | |
|---|---|---|---|
| 5,011,780 A * | 4/1991 | Perry ............. | A01K 45/00 119/6.8 |
| 8,197,852 B2 | 6/2012 | Strohbehn et al. | |
| 2009/0104173 A1* | 4/2009 | Strohbehn ....... | A61K 38/39 424/94.61 |
| 2009/0176423 A1* | 7/2009 | Sano ............. | D06M 13/48 442/59 |
| 2012/0237495 A1* | 9/2012 | Strohbehn ....... | C07K 1/12 424/94.61 |

FOREIGN PATENT DOCUMENTS

CN      102941027 A    2/2013

OTHER PUBLICATIONS

Website document entitled "What is the pH of H2O2 solutions?" Downloaded on Sep. 20, 2016. 2-pages. Obtained from http://www.h2o2.com/faqs/FaqDetail.aspx?fId=26.*
Hsieh et al., "Hydrogen peroxide treatment of eggshell membrane to control porosity", Food Chemistry, vol. 141, 2013, pp. 2117-2121.

* cited by examiner

*Primary Examiner* — Chris R Tate
(74) *Attorney, Agent, or Firm* — Muncy, Geissler, Olds & Lowe, P.C.

(57) ABSTRACT

The invention discloses a biocompatible semi-permeable membrane. The semi-permeable membrane is manufactured by: providing an eggshell membrane; and immersing the eggshell membrane in an aqueous hydrogen peroxide solution with a concentration of 0.35 to 35% for 8 to 144 hours.

4 Claims, 4 Drawing Sheets

SEMI-PERMEABLE MEMBRANE AND A METHOD OF MANUFACTURING THE SEMI-PERMEABLE MEMBRANE THEREOF

BACKGROUND OF THE INVENTION

1. Field of the Invention

The present invention generally relates to a semi-permeable membrane and, more particularly, to a biocompatible semi-permeable membrane. The present invention also relates to a method of manufacturing the semi-permeable membrane thereof.

2. Description of the Related Art

The dialysis membrane is the most important component of the dialyzer, also known as the artificial kidney. Generally, a semi-permeable membrane is used as the dialysis membrane. In hemodialysis, the patient's blood is pumped through the blood compartment of the dialyzer, exposing it to the semi-permeable membrane. Through the process known as diffusion, small molecules such as urea move along the concentration gradient through the semi-permeable membrane, thereby removing the small molecules from the patient's blood. Also, through the processes known as ultra-filtration and adsorption, water and middle molecules may pass through the semi-permeable membrane driven by a pressure gradient, thereby eliminating the excessive water and middle molecules from the patient's blood. As a result, the semi-permeable membrane that is used in the dialyzer and the way the semi-permeable membrane is used contribute on hemodialysis.

Conventional semi-permeable membranes can be divided into a conventional unmodified cellulosic membrane, a conventional semi-synthetic membrane and a conventional synthetic membrane.

Due to abundant surface hydroxyl groups, when the conventional unmodified cellulosic membrane is used in hemodialysis, the continuous contact with the patient's blood may easily induce activation of several inflammation pathways, such complements activation, white blood cells activation, platelets activation and coagulation, resulting in chronic inflammation, complements depletion and dysfunction of the inflammatory cells. Finally, the patient may suffer from an elevated opportunity of contracting cardiovascular diseases and infection.

The conventional semi-synthetic membrane is a modification of the conventional unmodified cellulosic membrane. Exposure of the surface hydroxyl groups is reduced by replacement or covering of the surface hydroxyl groups, thereby retarding white blood cells reduction due to the complements activation. However, the method for manufacturing the conventional semi-synthetic membrane is complicate, improving the cost for manufacturing the conventional semi-synthetic membrane thereof.

The conventional synthetic membrane with a larger average pore size can also be used in hemodialysis. However, because of the larger pore size, blood cells can easily diffuse through the conventional synthetic membrane, thereby decreasing the blood cell level in the blood. Moreover, if any endotoxins remain in the dialysates, the endotoxins probably may diffuse into the patient's blood, resulting infection of the patient.

In light of this, it is necessary to provide a biocompatible semi-permeable membrane.

SUMMARY OF THE INVENTION

It is therefore the objective of this invention to provide a biocompatible semi-permeable membrane, reducing the immune responses during hemodialysis.

It is another objective of this invention to provide a simple method for manufacturing a semi-permeable membrane, reducing the cost for manufacturing the semi-permeable membrane.

It is yet another objective of this invention to provide a method of manufacturing a semi-permeable membrane with an adjustable pore size, which is able to apply for filtration or dialysis of substances with different sizes.

One embodiment of the invention discloses a semi-permeable membrane manufactured by immersing an eggshell membrane in an aqueous hydrogen peroxide solution with a concentration of 0.35 to 35% for 8 to 144 hours.

In a preferred form shown, the semi-permeable membrane is manufactured by immersing the eggshell membrane in the aqueous hydrogen peroxide solution with a concentration of 35% for 8 to 48 hours, in particular for 24 hours.

In a preferred form shown, the eggshell membrane is collected from a raw egg.

The other embodiment of the invention discloses a method of manufacturing a semi-permeable membrane comprising: providing an eggshell membrane; and immersing the eggshell membrane in an aqueous hydrogen peroxide solution with a concentration of 0.35 to 35% for 8 to 144 hours to obtain the semi-permeable membrane.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
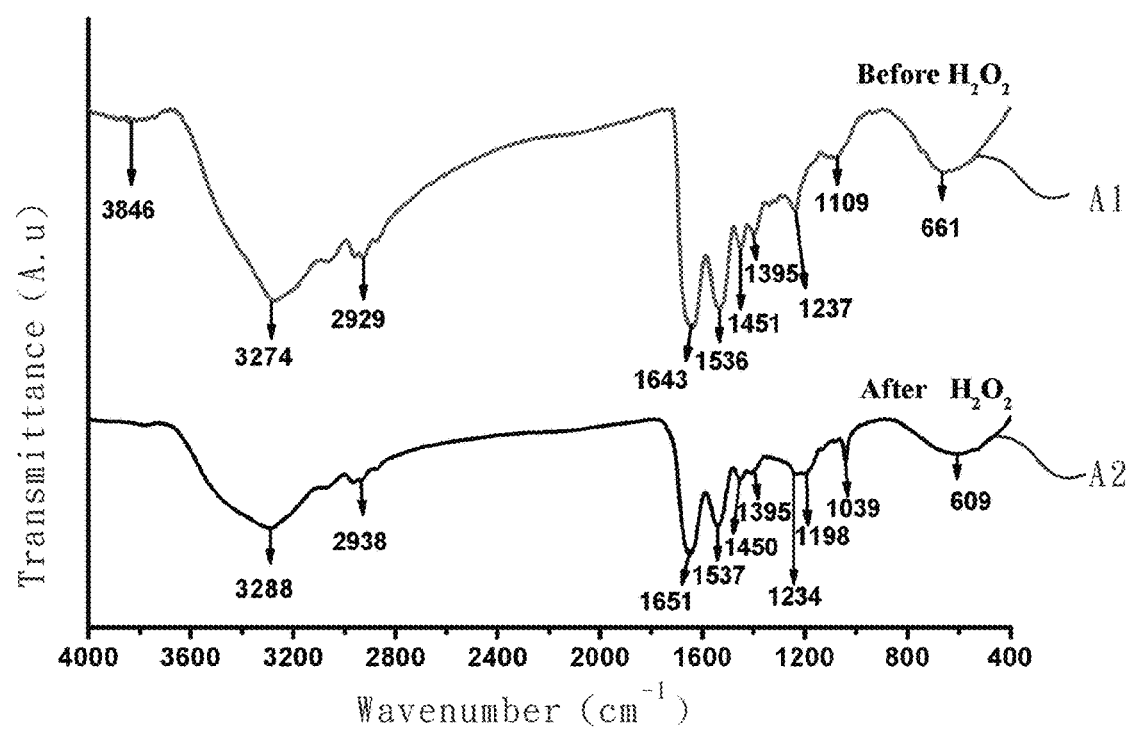
FIG. 1 depicts FTIR spectra of the eggshell membrane (group A1) and the semi-permeable membrane of the invention (group A2).

In the various figures of the drawings, the same numerals designate the same or similar parts. Furthermore, when the term "first", "second", "third", "fourth", "inner", "outer", "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

The semi-permeable membrane of the invention is a modification of an eggshell membrane by immersing into an aqueous hydrogen peroxide solution ($H_2O_{2(aq)}$). Preferably, the semi-permeable membrane of the invention is manufactured as follows: providing the eggshell membrane, and immersing the eggshell membrane into the $H_2O_{2(aq)}$ for 8 to 144 hours.

In detail, the eggshell membrane is collected from a raw egg. Moreover, according to the purpose of the semi-permeable membrane, the eggshell membrane can be collected from the raw egg of different species. For example, in order to manufacture a thick semi-permeable membrane, the eggshell membrane can be collected from the raw egg of ostrich, *Struthio camelus*. In addition, the eggshell membrane derived from a hatchery byproduct is easily available and thus decreases the cost for manufacturing the semi-permeable membrane of the invention. Besides, the eggshell membrane generally consists of protein (approximately 90 wt %, which is the major ingredient of the eggshell membrane), lipids (3 wt %) and carbohydrates (2 wt %), and therefore poses no immunogenicity, high biocompatibility and decreased immune responses when applying to hemodialysis.

In a preferable embodiment, the eggshell membrane, collected from the raw egg, is obtained as follows: Breaking the shell of the raw egg in the non-air cell end, the smaller one of the shell; flow outing the yolk and the albumen from the non-air cell end; forming a hole at the air cell end, the larger one of the shell; pouring water into the air cell; and separating the shell and the eggshell membrane.

The eggshell membrane is further immersed in the $H_2O_{2(aq)}$, forming cystine by cysteine oxidation to obtain the semi-permeable membrane of the invention. The $H_2O_{2(aq)}$ can be chose as a commercially available $H_2O_{2(aq)}$ with a concentration of 35% or as a diluent of the commercially available $H_2O_{2(aq)}$ with water. Preferably, the $H_2O_{2(aq)}$ has a concentration between 0.35% and 35%, and more particularly, the $H_2O_{2(aq)}$ has a concentration of 35%. Moreover, immersing time is selected to be 8 to 144 hours, but is still adjustable according to the concentration of the $H_2O_{2(aq)}$. For example, when using the 35% $H_2O_{2(aq)}$, the immersing time can preferably be 8 to 48 hours, and in particular be 24 hours.

To prove the semi-permeable membrane of the invention comprises cystine formed by cysteine oxidation and a shrunken pore size, chemical changes are demonstrated by FTIR and the pore size is observed by AFM topography image.

Trial (A). Chemical Changes of the Semi-Permeable Membrane of the Invention

Referring to Table 1, FTIR (Fourier transform infrared spectroscopy) is performed on the eggshell membrane (group A1) and the semi-permeable membrane of the invention (group A2).

TABLE 1

| Groups | $H_2O_2$ immersion | |
|---|---|---|
| | Concentration | Time |
| A1 | — | — |
| A2 | 35% | 24 hours |

Referring to FIG. 1, group A1 contains peaks at 3274 $cm^{-1}$ (O—H and N—H stretching), 2929 $cm^{-1}$ (C—H stretching), 1643 $cm^{-1}$ (amide C=O stretching), 1536 $cm^{-1}$ (amide N—H bending), 1451 $cm^{-1}$ ($CH_2$ scissoring), 1109 $cm^{-1}$ (amine C—N stretching), and 661 $cm^{-1}$ of (C—S stretching). However, in group A2, new peaks appears at 1039 $cm^{-1}$ and 609 $cm^{-1}$ due to the formation of a S—S bond, which shifted the a v(C—S) stretching vibration at 661 $cm^{-1}$ down to 609 $cm^{-1}$, and the C—N stretching at 1109 $cm^{-1}$ down to 1039 $cm^{-1}$. That is, the $H_2O_2$ immersion oxidizes cysteine, triggers the formation of the S—S bond, forming cystine, and finally results in the rearrangement of the fibrils and reduction in pore size.

Trial (B). Pore Sizes of the Semi-Permeable Membrane of the Invention

Referring to Table 2, the eggshell membrane (group B0) is used as a negative control. The semi-permeable membrane of the invention manufactured by immersing the eggshell membrane for different time is used as groups B1 to B5. Surface topographies of the groups B0 to B5 are analyzed by AFM (atomic force microscope).

TABLE 2

Figure 2:
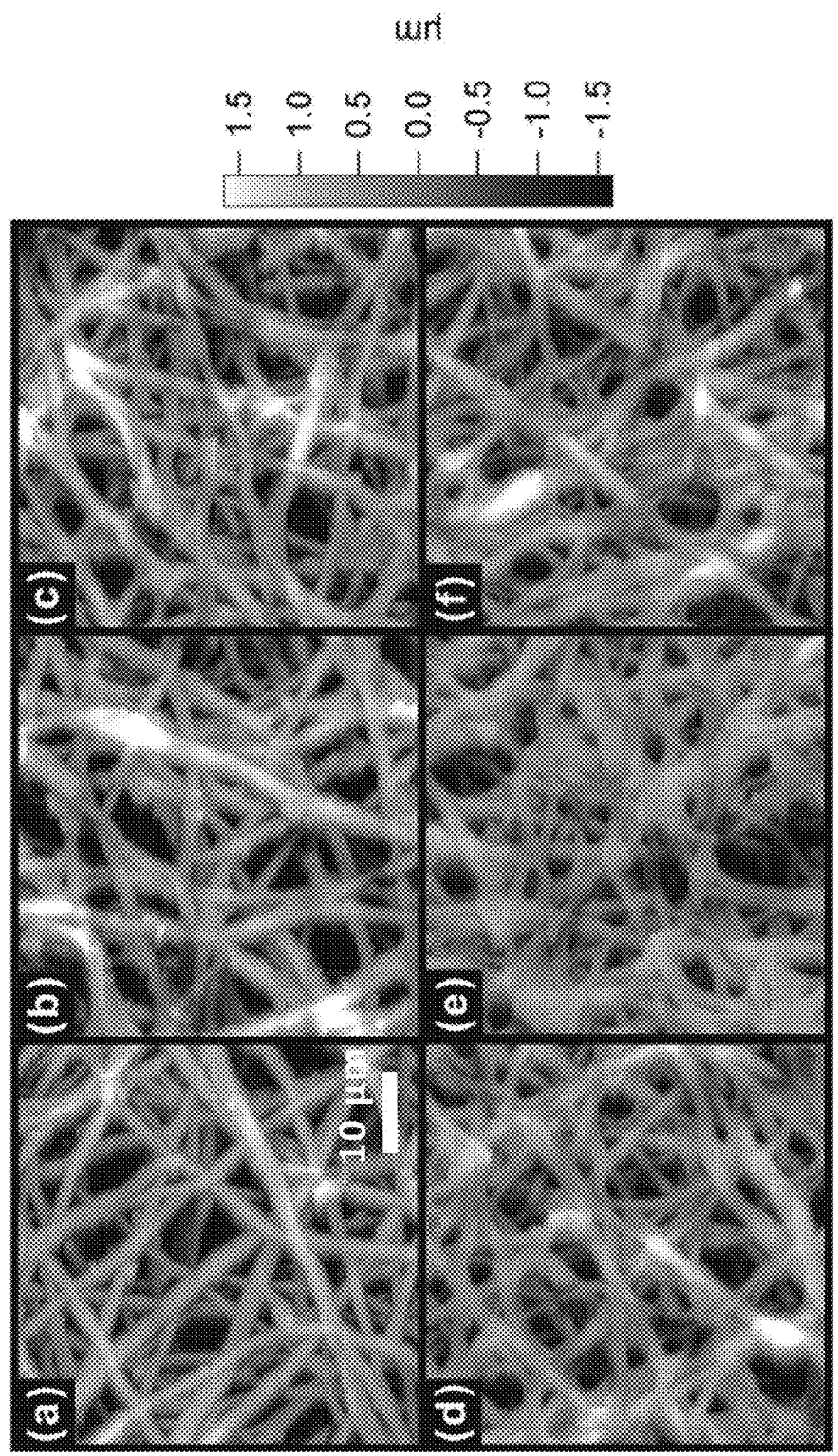
FIG. 2 depicts AFM images of the eggshell membrane (group B0, panel a) and the semi-permeable membrane of the invention (groups B1 to B5, panels b to f).

| Groups | $H_2O_2$ immersion | | FIG. 2 |
|---|---|---|---|
| | Concentration | Time | |
| B0 | — | — | panel(a) |
| B1 | 35% | 4 hours | panel(b) |
| B2 | 35% | 8 hours | panel(c) |
| B3 | 35% | 12 hours | panel(d) |
| B4 | 35% | 20 hours | panel(e) |
| B5 | 35% | 24 hours | panel(f) |

Referring to FIG. 2, all of the groups B0 to B5 show a cross-linked 3-D fiber-mesh structure. The width of the fibres is 2.5±0.5 μm. Moreover, before $H_2O_2$ immersion, the fibres of the eggshell membrane exhibit visible pores with pore sizes of 3 to 10 μm (group B0, as shown in panel (a)). The semi-permeable membrane of the invention has a relatively smaller pore size (group B1 to B5, as shown in panels (b) to (f)). In addition, pore size shrinks with the increase of the immersion time. For example, the pore size of group B5 is approximately between 1 and 5 μm.

Furthermore, to prove the diluent of the commercially available $H_2O_{2(aq)}$ with water can be used to manufacture the semi-permeable membrane of the invention, different concentration of the $H_2O_{2(aq)}$ are used. The different concentration of the $H_2O_{2(aq)}$ and the immersion time are listed in TABLE 3.

TABLE 3

Figure 3:
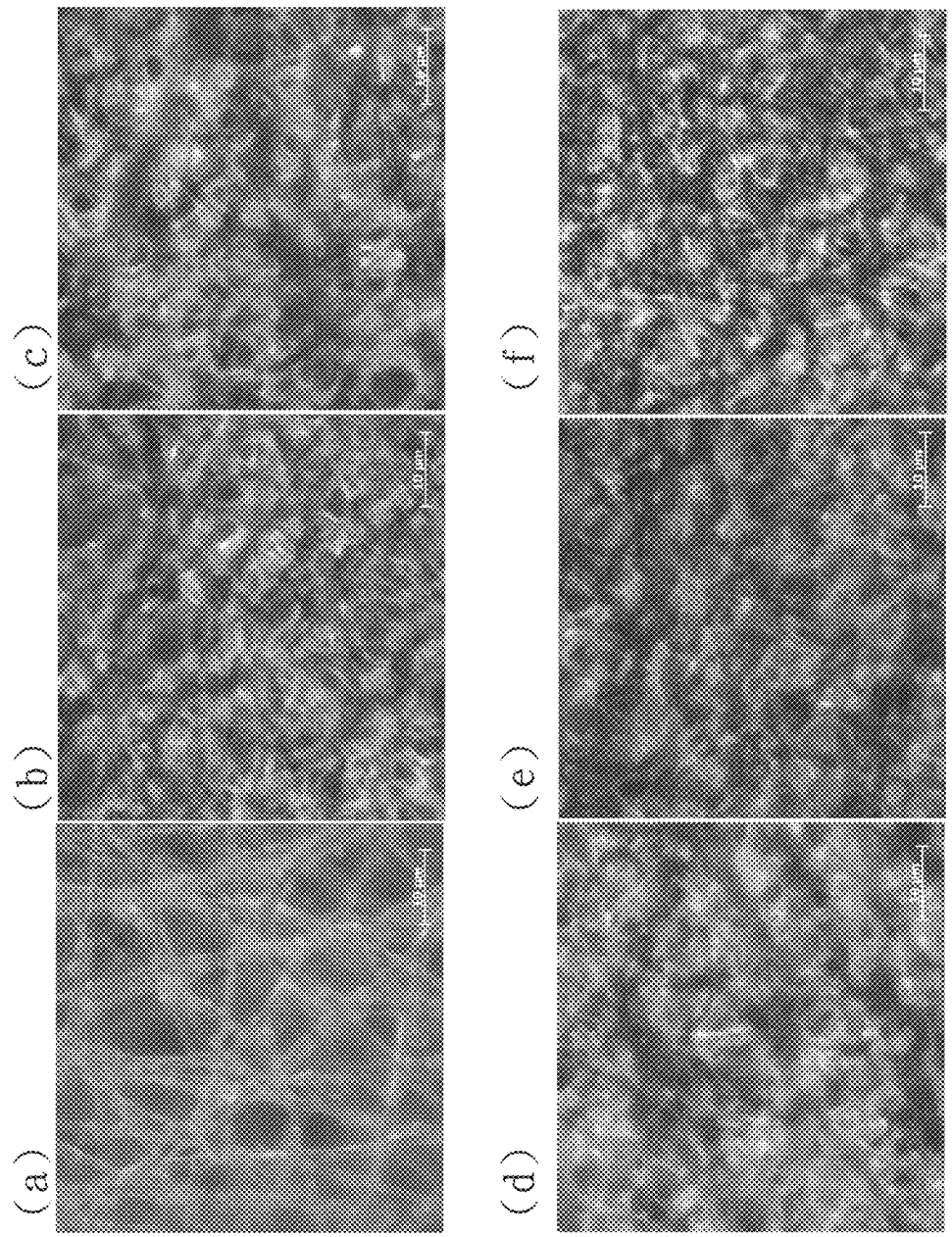
FIG. 3 depicts optical images of the eggshell membrane (group B0, panel a) and the semi-permeable membrane of the invention (groups B6 to B10, panels b to f).

| Groups | $H_2O_2$ immersion | | FIG. 3 |
|---|---|---|---|
| | Concentration | Time | |
| B0 | — | — | panel(a) |
| B6 | 7% | 48 hours | panel(b) |
| B7 | 3.5% | 72 hours | panel(c) |
| B8 | 1.75% | 72 hours | panel(d) |
| B9 | 0.7% | 132 hours | panel(e) |
| B10 | 0.35% | 144 hours | panel(f) |

Referring to FIG. 3, the diluent with concentration higher than 0.35% also can be used to manufacture the semi-permeable membrane of the invention. Moreover, as the concentration decreases, the immersion time should increase to manufacture the semi-permeable membrane with the similar pore size.

Trial (C). Blood Osmosis Test of the Semi-Permeable Membrane of the Invention

To prove the semi-permeable membrane can be used for homodialysis, the following trial (C) is performed.

Blood is collected from a 3 week-old male Sprague-Dawley rat. A 10 μL sample of the rat's blood is placed into a micro tube and diluted with 90 μL of 0.85 $NaCl_{(aq)}$ to prepare a blood sample stock solution. 1.5 μL of the blood sample stock solution is placed on the eggshell membrane (group C1) and the semi-permeable membrane of the invention (group C2), respectively. The droplet penetration is observed by using an optical microscope.

TABLE 3

| | H₂O₂ immersion | |
| Groups | Concentration | Time |
| --- | --- | --- |
| C1 | — | — |
| C2 | 35% | 24 hours |

Figure 4:
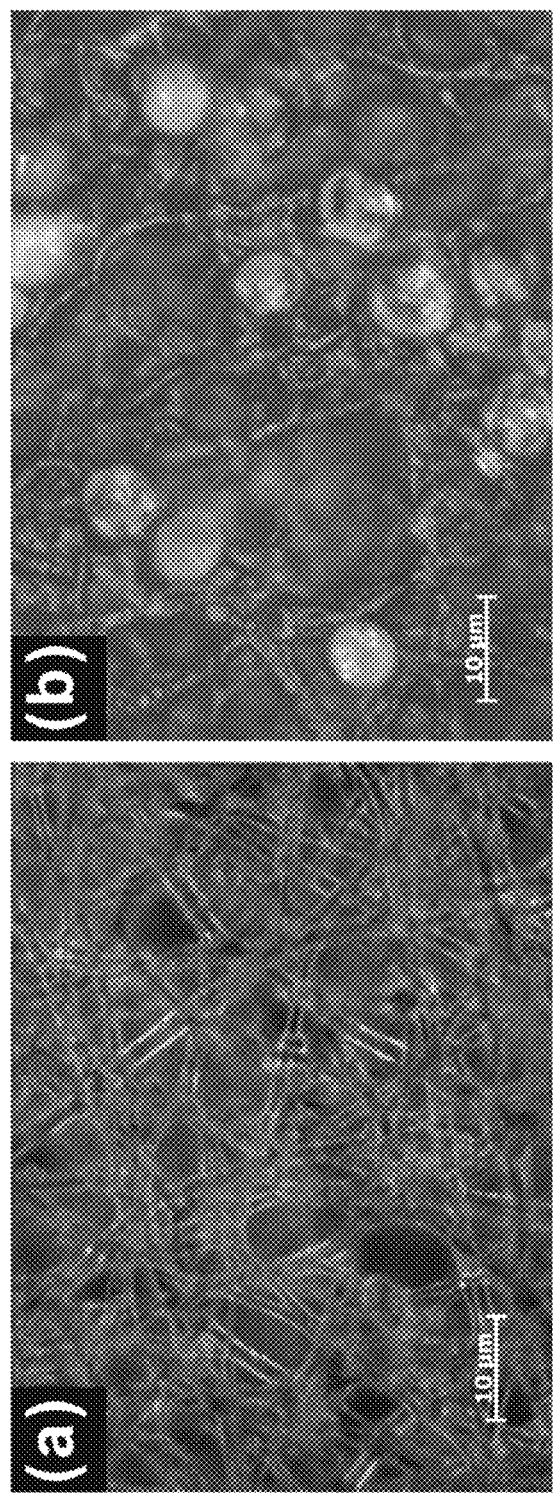
FIG. 4 depicts optical images acquired after a blood droplet was placed on the eggshell membrane (group C1) and the semi-permeable membrane of the invention (group C2).

Referring to FIG. 4, a complete penetration of the blood droplet on the eggshell membrane (group C1, as shown in panel (a)) because of the larger pore size of the eggshell membrane. In contrast, by $H_2O_2$ immersion, the semi-permeable membrane of the invention has a relative smaller pore size, and therefore the red blood cells, the round particles shown in panel (b), cannot penetrate the semi-permeable membrane of the invention.

In conclusion, the semi-permeable membrane of the invention is manufactured by immersing the eggshell membrane into the aqueous hydrogen peroxide solution. The eggshell membrane poses no immunogenicity and high biocompatibility, and therefore shows decreased immune responses when applying to hemodialysis.

Moreover, not only by using the easily available and cheap eggshell, but also by the easy process, the method of manufacturing the semi-permeable membrane of the invention can be a low cost method to manufacture the semi-permeable membrane.

Furthermore, by immersing the eggshell membrane into the aqueous hydrogen peroxide solution, cystine is formed by cysteine oxidation and further shrinks the pores of the semi-permeable membrane. That is to say, the method of manufacturing the semi-permeable membrane of the invention can be used to adjust the pore size of the final product, the semi-permeable membrane, thereby being suitable to filtrate or dialyze substances with different particle sizes.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A method of manufacturing a semi-permeable membrane comprising:
   providing an eggshell membrane;
   immersing the eggshell membrane in an aqueous hydrogen peroxide solution with a hydrogen peroxide concentration of 0.35% to 35% for 8 to 144 hours; and
   removing the aqueous hydrogen peroxide from the eggshell membrane to obtain the semi-permeable membrane.

2. The method of manufacturing the semi-permeable membrane as claimed in claim 1, wherein the eggshell membrane is immersed in an aqueous hydrogen peroxide solution with a hydrogen peroxide concentration of 35% for 8 to 48 hours.

3. The method of manufacturing the semi-permeable membrane as claimed in claim 2, wherein the eggshell membrane is immersed in the aqueous hydrogen peroxide solution for 24 hours.

4. The method of manufacturing the semi-permeable membrane as claimed in claim 1, wherein the eggshell membrane is collected from a raw egg.

* * * * *